United States Patent
Chen et al.

(10) Patent No.: US 11,537,161 B2
(45) Date of Patent: Dec. 27, 2022

(54) DISPLAY PANEL AND DISPLAY DEVICE

(71) Applicants: Wuhan Tianma Micro-Electronics Co., Ltd., Wuhan (CN); Wuhan Tianma Microelectronics Co., Ltd. Shanghai Branch, Shanghai (CN)

(72) Inventors: Min Chen, Shanghai (CN); Xinzhao Liu, Shanghai (CN)

(73) Assignees: Wuhan Tianma Micro-Electronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 269 days.

(21) Appl. No.: 17/020,274

(22) Filed: Sep. 14, 2020

(65) Prior Publication Data

US 2022/0035404 A1 Feb. 3, 2022

(30) Foreign Application Priority Data

Jul. 31, 2020 (CN) .......................... 202010756941.3

(51) Int. Cl.
   *G06F 1/16* (2006.01)
   *G02B 1/16* (2015.01)
   *G06F 1/18* (2006.01)

(52) U.S. Cl.
   CPC ............ *G06F 1/1609* (2013.01); *G02B 1/16* (2015.01); *G06F 1/1656* (2013.01); *G06F 1/189* (2013.01)

(58) Field of Classification Search
   CPC .... G02F 1/0107; G02F 1/1339; G02F 1/1341; G02F 1/13415; H01L 51/524; H01L 51/5246; H01L 27/3244; H01J 2329/867; H01J 2329/8675; H01J 9/261; Y10T 428/1059
   See application file for complete search history.

(56) References Cited

U.S. PATENT DOCUMENTS

| | | | | |
|---|---|---|---|---|
| 2009/0322979 A1* | 12/2009 | Kang | .................... | G02F 1/1339 349/153 |
| 2012/0235557 A1* | 9/2012 | Lee | .................... | H01L 51/5246 313/495 |
| 2016/0148562 A1* | 5/2016 | Jung | .................... | H01L 27/3276 345/212 |

FOREIGN PATENT DOCUMENTS

| | | |
|---|---|---|
| CN | 205609530 A | 9/2016 |
| CN | 108011051 A | 5/2018 |
| CN | 109830518 A | 5/2019 |
| CN | 110794991 A | 2/2020 |

* cited by examiner

*Primary Examiner* — Mariam Qureshi
(74) *Attorney, Agent, or Firm* — Anova Law Group, PLLC

(57) ABSTRACT

A display panel and a display device are provided in the present disclosure. The display panel, including a display region and a non-display region, includes a first base substrate and a second base substrate. The display panel further includes a sealing adhesive between the first base substrate and the second base substrate. The sealing adhesive is disposed in the non-display region by surrounding the display region and includes a main body part and a plurality of first extension parts connected to the main body part. The plurality of the first extension parts is between the main body part and the display region. The display panel further includes a first reflective metal part in the non-display region, where at least a portion of the first reflective metal part surrounds the display region, and includes a plurality of second reflective metal parts, arranged along a first direction, in the non-display region.

20 Claims, 16 Drawing Sheets

100

B-B

B-B

DISPLAY PANEL AND DISPLAY DEVICE

CROSS-REFERENCE TO RELATED APPLICATION

This application claims the priority of Chinese Patent Application No. 202010756941.3, filed on Jul. 31, 2020, the content of which is incorporated herein by reference in its entirety.

TECHNICAL FIELD

The present disclosure generally relates to the field of display technology and, more particularly, relates to a display panel and a display device.

BACKGROUND

The display industry has experienced decades of rapid development from the cathode ray tube (CRT) era to the liquid crystal display (LCD) era, and then to the current organic light-exiting diode (OLED) era. Display technology has become essential for electronic devices, from conventional mobile phones, tablets, TVs, and PCs, to modern smart wearable devices, virtual reality (VR) devices, and the like.

A display panel is an important component for electronic devices to achieve display function. Generally, the display panel may have a display region and a border region. The display region is configured to dispose pixel units, and the border region is configured to dispose scan lines, signal lines, a padding metal and a sealing adhesive of the pixel units. In the process of forming the sealing adhesive, burrs may be formed on the sealing adhesive inevitably. In the laser solidification process, the regions corresponding to the burrs may not be completely solidified since there is no metal to reflect heat energy, which affects the sealing performance and drop-proof performance of products.

SUMMARY

One aspect of the present disclosure provides a display panel, including a display region and a non-display region surrounding the display region. The display panel includes a first base substrate and a second base substrate that are oppositely configured and includes a sealing adhesive between the first base substrate and the second base substrate. The sealing adhesive is in the non-display region and surrounds the display region; the sealing adhesive includes a main body part and a plurality of first extension parts connected to the main body part; and the plurality of the first extension parts is between the main body part and the display region and arranged along a first direction, the first direction being an extending direction of the main body part. The display panel further includes a first reflective metal part in the non-display region, where at least a portion of the first reflective metal part surrounds the display region, and orthographic projections of the first reflective metal part and the main body part on a light-exiting surface of the display panel at least partially overlap. The display panel further includes a plurality of second reflective metal parts in the non-display region, where the plurality of second reflective metal parts is arranged along the first direction and disposed on a side of the first reflective metal part adjacent to the display region, and orthographic projections of at least one second reflective metal part of the plurality of second reflective metal parts and the plurality of first extension parts on the light-exiting surface overlap.

Another aspect of the present disclosure provides a display device, including the display panel provided by the embodiments of the present disclosure. The display panel includes a display region and a non-display region surrounding the display region. The display panel includes a first base substrate and a second base substrate that are oppositely configured and includes a sealing adhesive between the first base substrate and the second base substrate. The sealing adhesive is in the non-display region and surrounds the display region; the sealing adhesive includes a main body part and a plurality of first extension parts connected to the main body part; and the plurality of the first extension parts is between the main body part and the display region and arranged along a first direction, the first direction being an extending direction of the main body part. The display panel further includes a first reflective metal part in the non-display region, where at least a portion of the first reflective metal part surrounds the display region, and orthographic projections of the first reflective metal part and the main body part on a light-exiting surface of the display panel at least partially overlap. The display panel further includes a plurality of second reflective metal parts in the non-display region, where the plurality of second reflective metal parts is arranged along the first direction and disposed on a side of the first reflective metal part adjacent to the display region, and orthographic projections of at least one second reflective metal part of the plurality of second reflective metal parts and the plurality of first extension parts on the light-exiting surface overlap.

Other aspects of the present disclosure can be understood by those skilled in the art in light of the description, the claims, and the drawings of the present disclosure.

BRIEF DESCRIPTION OF THE DRAWINGS

Drawings incorporated in the specification and forming a part of the specification demonstrate the embodiments of the present disclosure and, together with the specification, describe the principles of the present disclosure.

DETAILED DESCRIPTION

Figure 1:
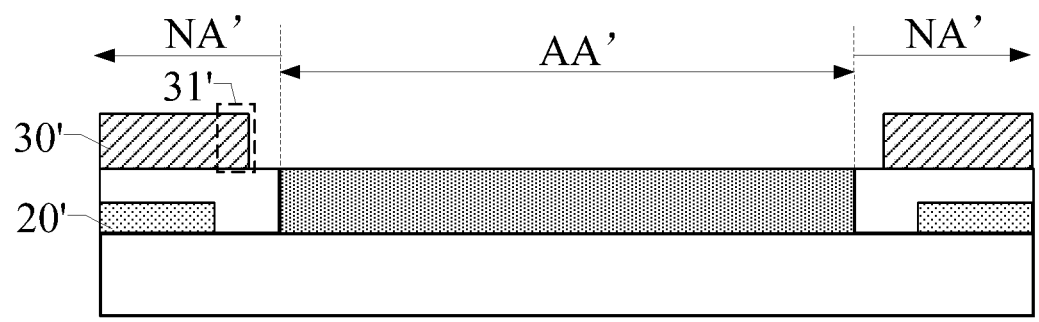
FIG. 1 illustrates a structural schematic of a display panel in the existing technology.

Various embodiments of the present disclosure are described in detail with reference to the drawings. It should be noted that the relative arrangement of components and steps, numerical expressions, and numerical values set forth in the embodiments may not limit the scope of the present disclosure unless specifically stated otherwise.

The following description of at least one exemplary embodiment is merely illustrative, which may not limit the present disclosure and its application or use.

Techniques, methods and equipment known to those skilled in the art may not be discussed in detail, but where appropriate, the techniques, methods and equipment should be considered as a part of the specification.

In all exemplary embodiments shown and discussed herein, any specific values should be interpreted as merely exemplary and not limiting. Therefore, other examples of the exemplary embodiments may have different values.

It should be noted that similar reference numerals and letters indicate similar items in the following drawings. Therefore, once an item is defined in one drawing, there is no need to discuss it further in subsequent drawings.

Referring to FIG. 1, FIG. 1 illustrates a structural schematic of a display panel in the existing technology. The display panel may include a display region AA' and a border region NA'. Pixel units may be disposed at the display region AA', and a padding metal 20' may be disposed at the border region NA', and a sealing adhesive 30' may be disposed above the padding metal 20'. In the process of forming the sealing adhesive, a burr 31' may be generated at the edge region of the sealing adhesive 30'. In the laser solidification process, the region corresponding to the burr 31' may not be solidified completely since there is no metal to reflect heat energy, which affects the sealing performance of the product. In addition, when the region corresponding to the burrs is not fully solidified, the solidification degree of the region corresponding to the burr and other regions may be uneven, which also affects the drop-proof performance of the product.

The embodiments of the present disclosure provide a display panel and a display device, which may use a second metal reflective part as a first extension part of the sealing adhesive to reflect thermal energy. In such way, it is beneficial for improving the incomplete solidification phenomenon in the existing technology and the sealing performance and drop-proof performance of the product.

Figure 2:
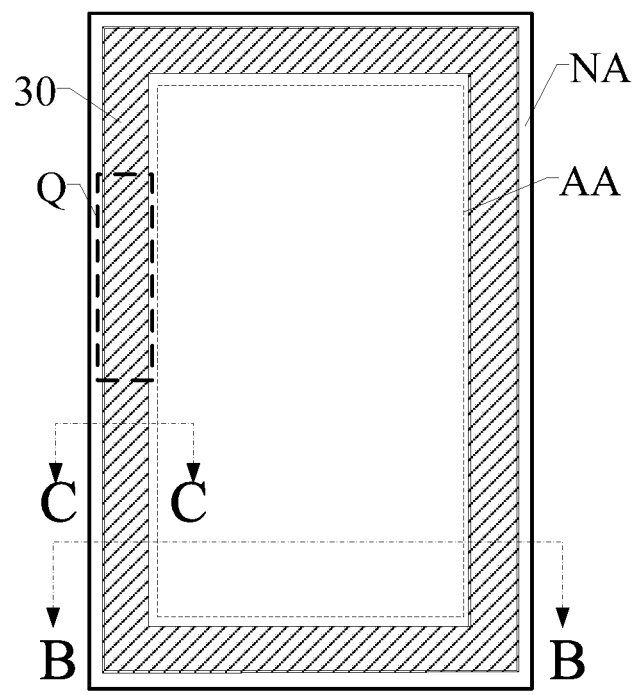
FIG. 2 illustrates a top view of a display panel according to various embodiments of the present disclosure.
Figure 3:
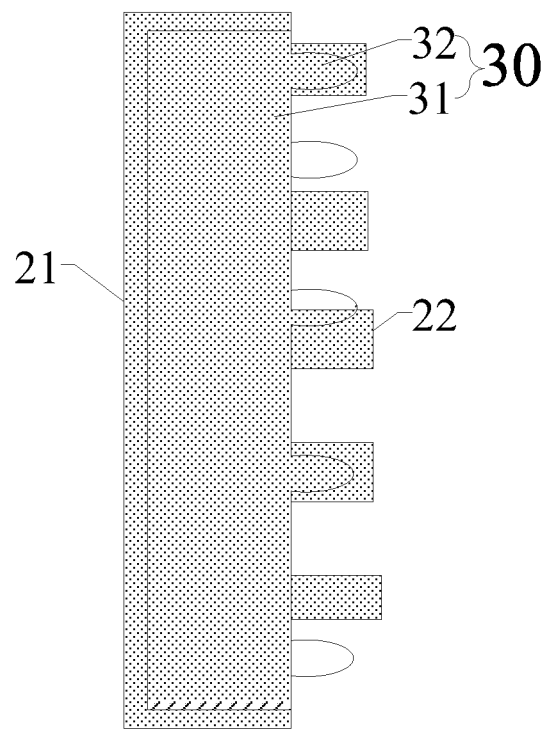
FIG. 3 illustrates a local enlarged schematic of a region Q in FIG. 2.
Figure 4:
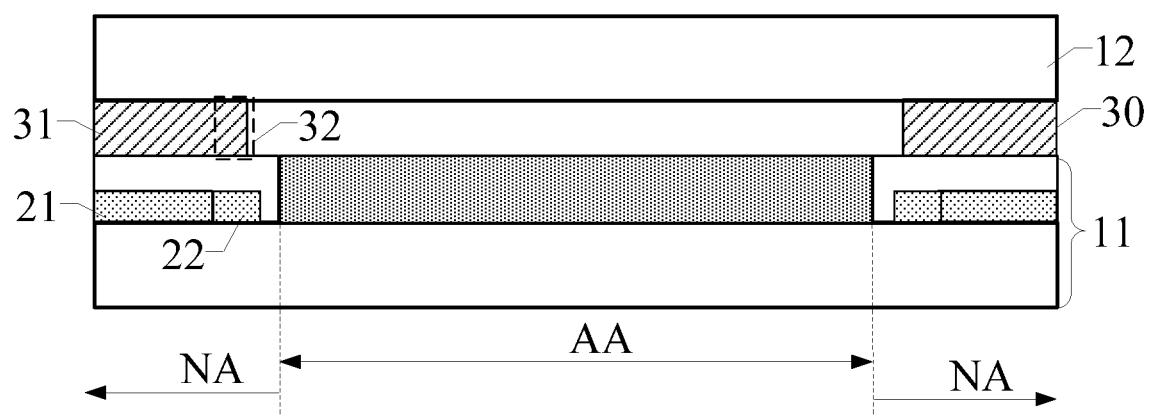
FIG. 4 illustrates a cross-sectional view of a display panel along a BB line in FIG. 2.

FIG. 2 illustrates a top view of a display panel according to various embodiments of the present disclosure. FIG. 3 illustrates a local enlarged schematic of a region Q in FIG. 2. FIG. 4 illustrates a cross-sectional view of a display panel along a BB line in FIG. 2. Referring to FIGS. 2-4, a display panel 100 may be provided by the embodiments of the present disclosure.

The display panel 100 may include a display region AA and a non-display region NA surrounding the display region AA. The display panel 100 may include:

a first base substrate 11 and a second base substrate 12 which are oppositely configured;

a sealing adhesive 30 between the first base substrate 11 and the second base substrate 12, where the sealing adhesive 30 may be in the non-display region NA and surround the display region AA; the sealing adhesive 30 may include a main body part 31 and a plurality of first extension parts 32 connected to the main body part 31; the first extension parts 32 may be between the main body part 31 and the display region AA, and may be arranged along a first direction which is the extending direction of the main body part 31;

a first reflective metal part 21 in the non-display region AA, where at least a portion of the first reflective metal part 21 may surround the display region AA, and the orthographic projections of the first reflective metal part 21 and the main body part 31 on the light-exiting surface of the display panel 100 may at least partially overlap; and a plurality of second reflective metal parts 22 in the non-display region AA, where the plurality of second reflective metal parts 22 may be arranged along the first direction and disposed on a side of the first reflective metal part 21 adjacent to the display region AA, and the orthographic projections of at least one second reflective metal part 22 of the plurality of second reflective metal parts and the plurality of first extension parts 32 on the light-exiting surface may overlap.

It should be noted that a rectangular display panel 100 is merely used as an example in FIG. 2 to illustrate the display panel 100. In some other embodiments of the present disclosure, the display panel 100 may also be embodied in other shapes, such as a circular shape, an elliptical shape, a special-shaped structure, and the like. In addition, FIG. 4 may merely illustrate the relative position relationship of the first base substrate 11, the second base substrate 12, the sealing adhesive 30, and the first reflective metal part 21, which may not represent the actual quantity and size of the film layers of the display panel 100.

For example, referring to FIGS. 2-4, the display panel 100 provided in the present disclosure may include the first base substrate 11 and the second base substrate 12 which are oppositely disposed, and the sealing adhesive 30 between the first base substrate 11 and the second base substrate 12. The sealing adhesive 30 may be in the non-display region NA and surround the display region AA. Optionally, the composition of the sealing adhesive 30 may include frit. During the sealing process, the frit may be melted by laser heating, and the melted frit may then be solidified to bond and fix the first base substrate 11 with the second base substrate 12. The sealing adhesive 30 may include the main body part 31 and the plurality of first extension parts 32 connected to the main body part 31; and the first extension parts 32 may be between the main body part 31 and the display region AA. The display panel 100 of the present disclosure may further include the first reflective metal part 21 corresponding to the main body part 31 of the sealing adhesive 30 and the second reflective metal parts 22 corresponding to the first extension parts 32. The first reflective metal part 21 may be used to reflect the laser energy to the main body part 31, thereby providing solidification energy for the region corresponding to the main body part 31. The second reflective metal parts 22 may be used to reflect the laser energy to the first extension parts 32, thereby providing solidification energy for the regions corresponding to the first extension parts 32.

In the existing technology, when burrs are generated on the sealing adhesive, the regions corresponding to the burrs may not have metal to reflect heat energy, so that the regions corresponding to the burrs may not be solidified completely, which may cause uneven solidification effect of the main body part region and the burr regions of the sealing adhesive, thereby affecting the sealing performance and drop-proof performance of the product. Obviously, compared with the existing technology, the display panel 100 in the present disclosure may include the second reflective metal parts 22, and the orthographic projections of at least one second reflective metal part 22 and the first extension parts 32 on the light-exiting surface may overlap. The second reflective metal parts 22 may be used to reflect solidification energy for the first extension parts 32 of the sealing adhesive 30, such that the solidification difference between the main body part 31 and the first extension parts 32 of the sealing adhesive 30 may be reduced to improve the overall solidification uniformity of the sealing adhesive 30, which is not only beneficial for improving the sealing effect of the product, but also for improving the drop-proof performance of the product.

It should be noted that FIG. 3 is merely a local enlarged schematic of the region Q in FIG. 2. In other embodiments of the present disclosure, the first reflective metal part 21 and the second reflective metal parts 22 may be disposed in at least three border regions of the display panel by surrounding the display region, such as the left border region, the right border region and the upper border region under the viewing angle shown in FIG. 2. Obviously, in other embodiments of the present disclosure, the first reflective metal part 21 and the second reflective metal parts 22 may also be disposed in four border regions of the display panel to form a closed-ring structure surrounding the display region, which may not be limited according to the embodiments of the present disclosure.

Optionally, referring to FIG. 3, the plurality of second reflective metal parts 22 arranged along the first direction may be introduced in the display panel of the present disclosure, and a spacing may be between two adjacent second reflective metal parts 22 to form a trench structure. That is, the second reflective metal parts 22 may be discrete, thereby reducing the orthographic projection area of the second reflective metal parts 22 on the light-exiting surface of the display panel. During the laser solidification process, the magnitude of laser energy, which can be reflected by the second reflective metal parts, is positively correlated with the area of the second reflective metal parts. If the second reflective metal parts are disposed as a continuous structure, the area of the second reflective metal parts may be increased, and the intensity of the reflected laser energy thereof may be increased, which may cause over-solidification of the first extension parts with relatively small areas and further lead to new solidification difference between the main body part and the first extension parts. Therefore, the second reflective metal parts may be disposed as a non-continuous structure, which is beneficial for rationally controlling the intensity of the laser energy reflected by the second reflective metal parts and avoiding the over-solidification of the first extension parts. In such way, it is beneficial for reducing the solidification difference between the first extension parts and the main body part to improve the solidification uniformity of the entire sealing adhesive.

Figure 5:
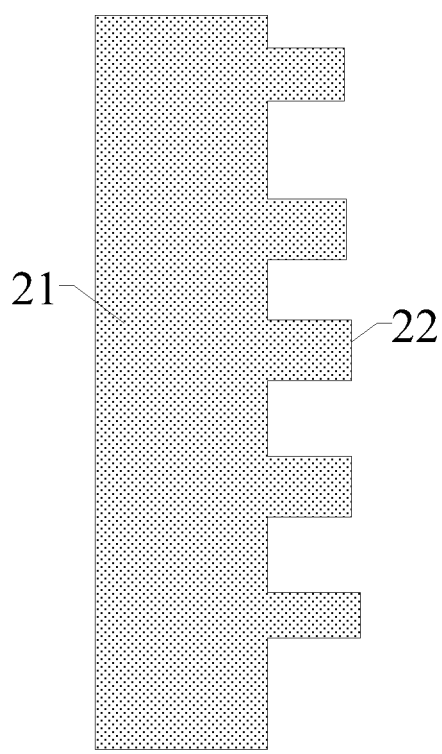
FIG. 5 illustrates a relative position relationship between a first reflective metal part and a second reflective metal part according to various embodiments of the present disclosure.

FIG. 5 illustrates a relative position relationship between the first reflective metal part and the second reflective metal parts according to various embodiments of the present disclosure. In an optional embodiment of the present disclosure, referring to FIG. 5, the second reflective metal parts 22 and the first reflective metal part 21 may be electrically connected with each other and formed into one single piece.

For example, the first reflective metal part 21 and the second reflective metal parts 22 may be formed into one single piece. That is, the first reflective metal part 21 and the second reflective metal parts 22 may be disposed at a same layer and fabricated by a same process. There is no need to introduce separate processes for the first reflective metal part 21 and the second reflective metal parts 22; and the first reflective metal part 21 and the second reflective metal parts 22 may be formed simultaneously in a same process, which is beneficial for simplifying the formation process of the first reflective metal part 21 and the second reflective metal parts 22 and the production process of the entire display panel 100 to improve the production efficiency.

Obviously, in other embodiments of the present disclosure, the first reflective metal part 21 and one portion of the second reflective metal parts 22 may also be located at different film layers and may not be connected to each other. For example, when the display panel 100 includes the plurality of second reflective metal parts 22, the plurality of second reflective metal parts 22 may be at a same film layer which is different from the film layer of the first reflective metal part 21. Or, when the display panel 100 includes the plurality of second reflective metal parts 22, the plurality of second reflective metal parts 22 may be at different film layers, and the first reflective metal part 21 may be disposed at a layer same as the portion of the second reflective metal parts 22 or may be disposed at a layer different from all second reflective metal parts 22.

In an optional embodiment of the present disclosure, referring to FIG. 3, the first reflective metal part 21 may be connected to a fixed level signal.

For example, the first reflective metal part 21 in one embodiment may be used to reflect layer energy for the main body part 31 of the sealing adhesive 30 and also to receive a fixed level signal such as a ground signal. The reflective metal part 21 may be multiplexed as a ground signal line in the display panel 100. Optionally, the first reflective metal part 21 may be electrically connected to an electro-static discharge circuit (ESD) to conduct static electricity in the display panel 100, thereby improving the anti-static capability of the display panel 100. In actual application processes, when the display panel 100 includes a ground wire, the first reflective metal part 21 in the present disclosure may be multiplexed as the ground wire in the display panel 100. Therefore, there is no need to introduce a separate film layer structure and a separate formation process for the first reflective metal part 21, which is not only beneficial for simplifying the film layer structure of the display panel 100, but also for simplifying the formation process of the display panel 100 to improve the production efficiency.

Figure 6:
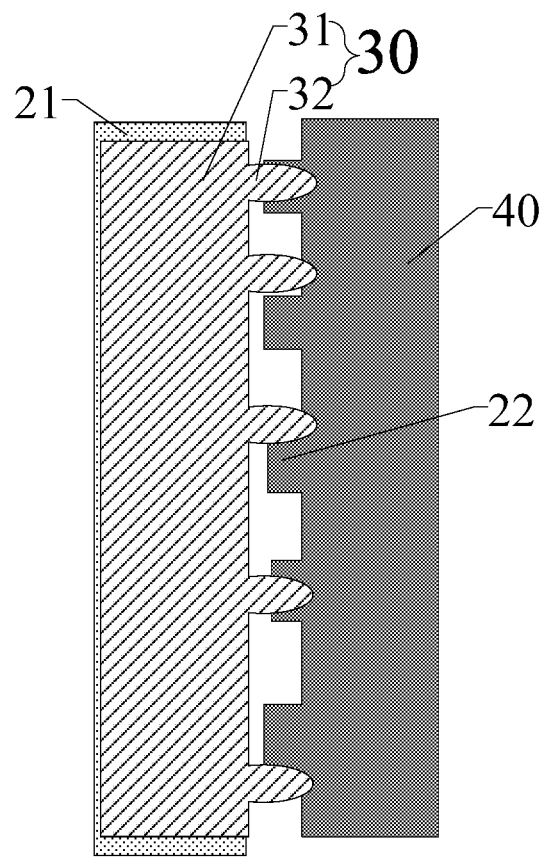
FIG. 6 illustrates another local enlarged schematic of a region Q in FIG. 2.

FIG. 6 illustrates another local enlarged schematic of the region Q in FIG. 2. In an optional embodiment of the present disclosure, referring to FIG. 6, the display panel 100 provided by the present disclosure may further include a first metal block 40 extending along the first direction. The first metal block 40 may be disposed on a side of the second reflective metal parts 22 adjacent to the display region AA; and the second reflective metal parts 22 and the first metal block 40 may be electrically connected with each other and formed into one single piece.

For example, the embodiment shown in FIG. 6 may illustrate a case that the second reflective metal parts 22 and the first reflective metal part 21 are disposed separately. Referring to FIG. 2 and FIG. 6, the display panel 100 may further include the first metal block 40 extending along the first direction. The first metal block 40 may surround the display region AA and be located between the first reflective metal part 21 and the display region AA; and the second reflective metal parts may be located on a side of the first metal block 40 adjacent to the first reflective metal part 21. In such way, the second reflective metal part 22 may reflect the laser energy for the solidification of the region corresponding to the first extension part 32 in the sealing adhesive 30, thereby facilitating the reduction of the solidification difference between the main body part 31 and the first extension part 32 of the sealing adhesive 30. In particular, in one embodiment, all second reflective metal parts 22 and the first metal block 40 may be electrically connected with each other and formed into one single piece; the quantity of second reflective metal parts 22 which are electrically connected to the first metal block 40 and formed into one single piece with the first metal block 40 may be more than one; and a trench structure may be formed between two adjacent second reflective metal parts 22. In one embodiment, by disposing the second reflective metal parts 22 and the first reflective metal part 21 separately, the first reflective metal part 21 may be fabricated into a regular shape, which is beneficial for simplifying the formation process of the first reflective metal part 21. Furthermore, the second reflective metal parts 22 and the first metal block 40 are electrically connected with each other and formed into one single piece, such that the formation of the second reflective metal parts 22 may be completed while the first metal block 40 is formed, which is also beneficial for simplifying the formation process of the display panel 100 and improving the production efficiency of the display panel 100.

Optionally, in one embodiment shown in FIG. 6, the first metal block 40 may be connected to a fixed level signal. The first metal block 40 may be used as the ground wire of the display panel 100 to conduct static electricity in the display panel 100, thereby improving the antistatic capability of the display panel 100. When the display panel 100 includes the ground wire, it is equivalent that a special design is performed on the ground wire in the display panel 100 in one embodiment, and a plurality of protruding structures formed on the ground wire may be used as the second reflective metal parts in the present disclosure. There is no need to separately introduce a formation process and a film layer structure for the second reflective metal parts 22 at the present disclosure, and the formation process and the film layer of the ground wire in the display panel 100 may be multiplexed as that of the second reflective metal parts 22. In such way, it is also beneficial for simplifying the formation process of the display panel 100 after introducing the second reflective metal parts 22 in the display panel 100 and for improving the production efficiency of the display panel 100.

It should be noted that FIG. 6 is merely a local enlarged schematic of the region Q in FIG. 2. In other embodiments of the present disclosure, the first metal block may be disposed in at least three border regions of the display panel by surrounding the display region, such as the left border region, the right border region and the upper border region under the viewing angle shown in FIG. 2. Obviously, in other embodiments of the present disclosure, the first metal block 40 may also be disposed in four border regions of the display panel to form a closed-ring structure surrounding the display region, which may not be limited according to the embodiments of the present disclosure.

Figure 7:
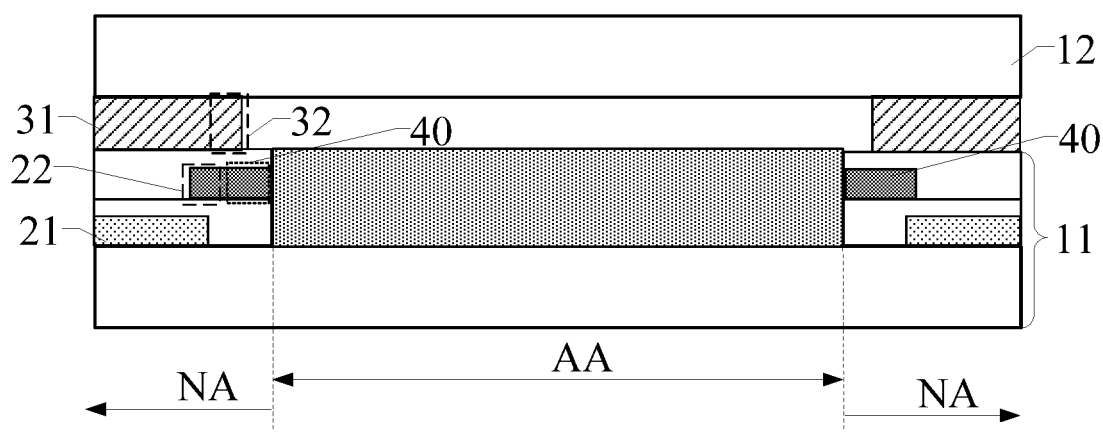
FIG. 7 illustrates another cross-sectional view of a display panel along a BB line in FIG. 2.

FIG. 7 illustrates another cross-sectional view of the display panel 100 along a BB line in FIG. 2. Optionally, referring to FIG. 7, the first metal block 40 and the first reflective metal part 21 may be disposed at different layers.

For example, in one embodiment shown in FIG. 7, the first metal block 40 may be on the side of the first reflective metal part 21 away from the base substrate. In such way, during the laser solidification process, the distance between the position of the second reflective metal part 22 electrically connected to the first metal block 40 and a laser light source may be less than the distance between the first reflective metal part 21 and the laser light source. Therefore, the laser energy which can be reflected by the second reflective metal part 22 with a same unit area may be greater than the laser energy which can be reflected by the first reflective metal part 21 with the same unit area. Since the area of the first extension part 32 is relatively small, at this point, the laser energy reflected by the second reflective metal part 22 with a relatively small area may be introduced to reliably solidify the region corresponding to the first extension part 32, which is beneficial for saving the material consumption of the second reflective metal part 22 and the production cost of the display panel 100.

It should be understood that when the area of the orthographic projection of the second reflective metal part 22 on the base substrate is relatively large, if the laser energy reflected by the second reflective metal part 22 can exceed the energy required for solidifying the first extension part 32, the first metal block 40 electrically connected to the second reflective metal part 22 may also be disposed on the side of the first reflective metal part 21 adjacent to the base substrate, thereby increasing the distance between the second reflective metal part 22 and the laser light source and reducing the laser energy reflected by the second reflective metal part 22 toward the region where the first extension part 32 is located.

Figure 8:
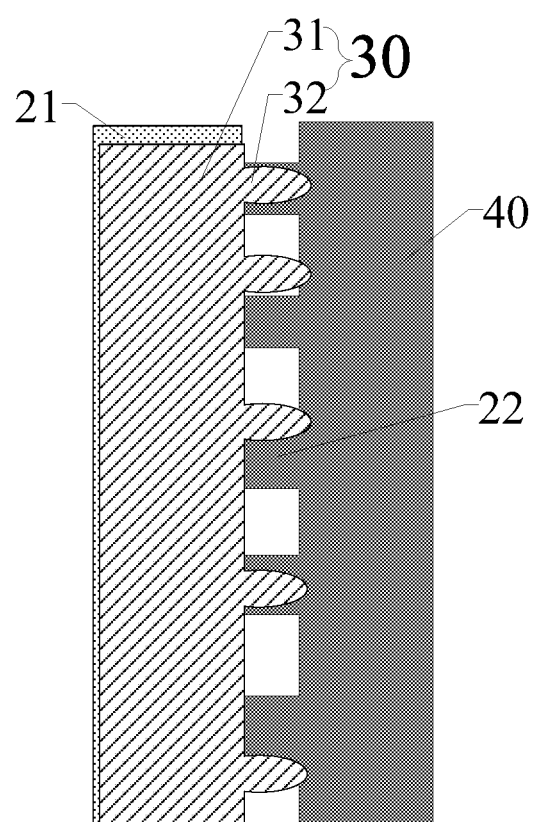
FIG. 8 illustrates another local enlarged schematic of a region Q in FIG. 2.

FIG. 8 illustrates another local enlarged schematic of the region Q in FIG. 2. In an optional embodiment of the present disclosure, referring to FIGS. 7-8, the orthographic projections on the light-exiting surface of at least a portion of the second reflective metal parts 22 electrically connected to the first metal block 40 and the first reflective metal part 21 may partially overlap.

For example, referring to FIG. 2, FIG. 7, and FIG. 8, at least the portion of the second reflective metal parts 22 electrically connected to the first metal block 40 may extend along a direction adjacent to the first reflective metal part 21, and the orthographic projections on the light-exiting surface of at least the portion of the second reflective metal parts 22 and the first reflective metal part 21 may overlap. It is equivalent that the extension degree of the second reflective metal parts 22 from the display region AA to the direction of the first reflective metal part 21 may be increased. Since the first extension part 32 extends along a direction from the first reflective metal part 21 to the display region AA, setting the orthographic projections of the second reflective metal parts 22 and the first reflective metal part 21 on the light-exiting surface to be partially overlapped may be beneficial for increasing the areas of the orthographic projections of the second reflective metal parts 22 and the first reflective metal part 21 on the light-exiting surface. In such way, more laser energy reflected by the second reflective metal parts 22 may act on the region where the first extension part 32 is located, which is beneficial for providing more solidification energy to the region where the first extensions part 32 is located. Therefore, it is beneficial for improving the solidification effect of the region where the first extensions part 32 is located and for reducing the solidification difference between the region where the first extension part 32 is located and the region where the main body part 31 is located, thereby improving the sealing performance and drop-proof performance of the product.

Optionally, referring to FIGS. 7-8, the above-mentioned first metal block 40 may be multiplexed as the ground wire in the display panel, and the plurality of second reflective metal parts 22 with protruding structures may be electrically connected to the first metal block 40 to form an electrostatic coupling ring. When static electricity is applied on the first reflective metal part 21, since the orthographic projections on the light-exiting surface of at least the portion of the second reflective metal parts 22 electrically connected to the first metal block 40 and the first reflective metal part 21 partially overlap, electrostatic charges may be induced on the second reflective metal parts 22 electrically connected to the first metal block 40 due to the effect of electrostatic coupling. Since the electrostatic coupling ring has a tip (corresponding to the second reflective metal part 21), the most electrostatic charges may accumulate at the tip during electrostatic induction, such that most electrostatic charges may be accumulated at the second reflective metal parts 22. The second reflective metal parts 22 and the first reflective metal part 21 may form a capacitor. Since the areas of two electrode plates of the capacitor is significantly small, the capacitance may also be significantly small, that is, the capacitor may contain a small quantity of charges. Since most of the electrostatic charges are accumulated at the second reflective metal parts 22, the capacitor breakdown between the second reflective metal parts 22 and the first reflective metal part 21 may easily occur through coupling when the first reflective metal part 21 has a relatively large quantity of electrostatic charges, such that a conduction path is formed between the second reflective metal parts 22 and the first reflective metal part 21. Since the electrostatic coupling ring is grounded, the second reflective metal parts 22 in the electrostatic coupling ring may instantly introduce the large amount of charges at the first reflective metal part 21 into the ground, such that the charges may not cause damage to the metal wiring in the display panel, which is beneficial for ensuring the safety of the display device in the display panel and improving the antistatic capability of the display panel.

Figure 9:
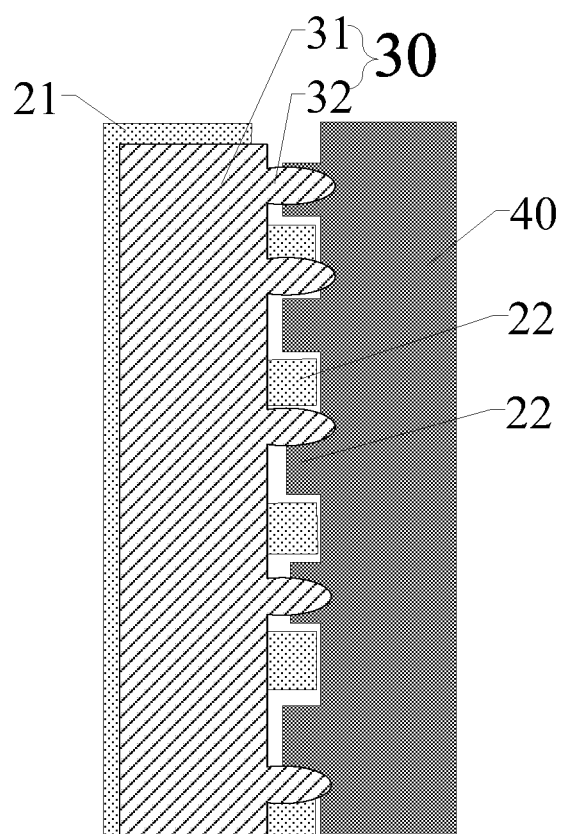
FIG. 9 illustrates another local enlarged schematic of a region Q in FIG. 2.

FIG. 9 illustrates another local enlarged schematic of the region Q in FIG. 2. In an optional embodiment, referring to FIG. 2 and FIG. 9, the display panel 100 may further include the first metal block 40 extending along the first direction. The first metal block 40 may be disposed on the side of the second reflective metal parts 22 adjacent to the display region AA.

At least a portion of the second reflective metal parts 22 may be electrically connected with the first reflective metal part 21, together formed into one single piece. At least a portion of the second reflective metal parts 22 may be electrically connected with the first metal block 40, together formed into one single piece.

For example, one embodiment shown in FIG. 9 illustrates another structural schematic of the second reflective metal parts 22 on the display panel 100. Referring to FIG. 2 and FIG. 9, the display panel 100 may further include the first metal block 40 between the first reflective metal part 21 and the display region AA. Among the plurality of second reflective metals, a portion of the second reflective metals 22 and the first reflective metal 21 may be electrically connected with each other and formed into one single piece; and the other portion of the second reflective metals 22 and the first metal block 40 may be electrically connected with each other and formed into one single piece. That is, the portion of the second reflective metals 22 and the first reflective metal 21 may be formed simultaneously, and the other portion of the second reflective metals 22 and the first metal block 40 may be formed simultaneously. There is also no need to introduce a separate film layer structure and a separate formation process for the second reflective metal parts 22, which is also beneficial for simplifying the formation process of the display panel 100 when the second reflective metal parts are introduced in the display panel 100 and for improving the production efficiency of the display panel 100.

Figure 10:
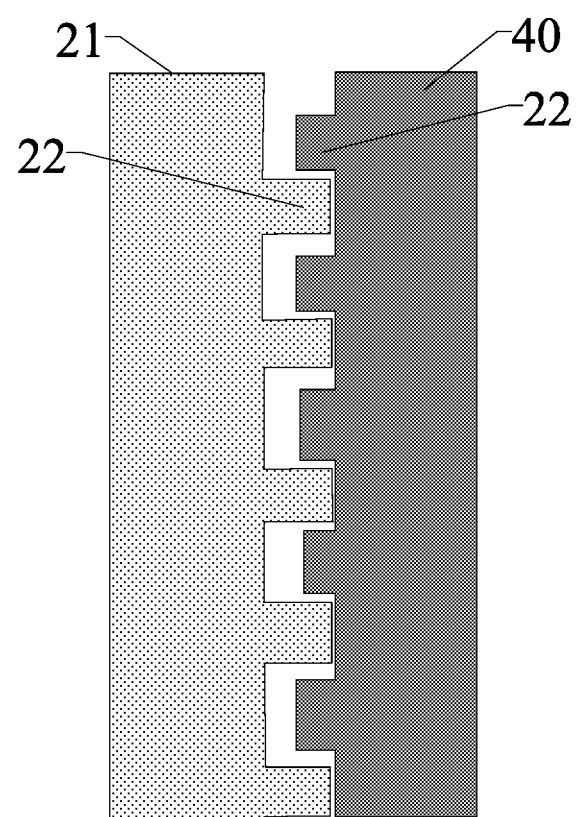
FIG. 10 illustrates an arrangement schematic of two types of second reflective metal parts in one embodiment shown in FIG. 9.

Optionally, FIG. 10 illustrates an arrangement schematic of two types of second reflective metal parts in one embodiment shown in FIG. 9. Referring to FIG. 10, the second reflective metal parts 22 electrically connected to the first metal block 40 and the second reflective metal parts 22 electrically connected to the first reflective metal part 21 may be alternately arranged along the first direction. It should be noted that, in order to clearly reflect the positional relationship between the second reflective metal parts 22, the first reflective metal part 21 and the first metal block 40, the second reflective metal parts 22 electrically connected to the first metal block 40 and the second reflective metal parts 22 electrically connected to the first reflective metal part 21 may be respectively filled with different fillings in FIG. 10. When the second reflective metal parts 22 electrically connected to the first metal block 40 and the second reflective metal parts 22 electrically connected to the first reflective metal part 21 are set to be alternately arranged along the first direction, the second reflective metal parts 22 electrically connected to the first metal block 40 and the first reflective metal part 21 respectively may be formed using a same specification. For example, it is assumed that in the second reflective metal parts 22 electrically connected to the first metal block 40, the distance between any two adjacent second reflective metal parts 22 is Cl, then in the second reflective metal parts 22 electrically connected to the first reflective metal part 21, the distance between any two adjacent second reflective metal parts 22 may also be set to Cl. That is, the second reflective metal parts 22 may be formed with the same specification and dimension, which is beneficial for simplifying the formation process of the second reflective metal parts 22.

It should be understood that FIGS. 9-10 only illustrate the manner that the second reflective metal parts 22 electrically connected to the first metal block 40 and the first reflective metal part 21 respectively are alternately arranged one by one along the first direction, that is, the quantity of alternate units is 1. In some other embodiments of the present disclosure, the quantity of alternate units of the second reflective metal parts 22 may also be two or more. For example, the second reflective metal parts 22 electrically connected to the first metal block 40 and the first reflective metal part 21 respectively are alternately arranged two by two along the first direction, which may reflect the laser energy to the first extension parts 32 in the sealing adhesive 30 to achieve the technical effect of the sealing adhesive 30.

Optionally, in some embodiments shown in FIGS. 9-10, the first metal block 40 may be connected to a fixed level signal.

In an optional embodiment of the present disclosure, when the first metal block 40 receives a fixed level signal, the first metal block 40 may be multiplexed as a fixed level signal line in the display panel. For example, the fixed level signal line may be used as the ground line of the display panel 100, and the received level signal may be the ground signal, which may be used to conduct static electricity in the display panel 100, thereby improving the antistatic capability of the display panel 100.

In another optional embodiment of the present disclosure, when the first metal block 40 is multiplexed as the fixed level signal line in the display panel, the fixed level signal line may also be, for example, a high level signal line or a low level signal line in the display panel for transmitting a fixed high level signal or a fixed low level signal. It is equivalent that a special design is performed on the fixed level signal line in the display panel 100 in one embodiment, and the plurality of protruding structures formed on the fixed level signal line may be used as the second reflective metal parts in the present disclosure. There is no need to separately introduce a formation process and a film layer structure for the second reflective metal parts 22 of the present disclosure, and the formation process and film layer of the fixed level signal line in the display panel 100 may be multiplexed as that of the second reflective metal parts 22, which is also beneficial for simplifying the formation process of the display panel 100 after introducing the second reflective metal parts 22 in the display panel 100 and for improving the production efficiency of the display panel 100.

Figure 11:
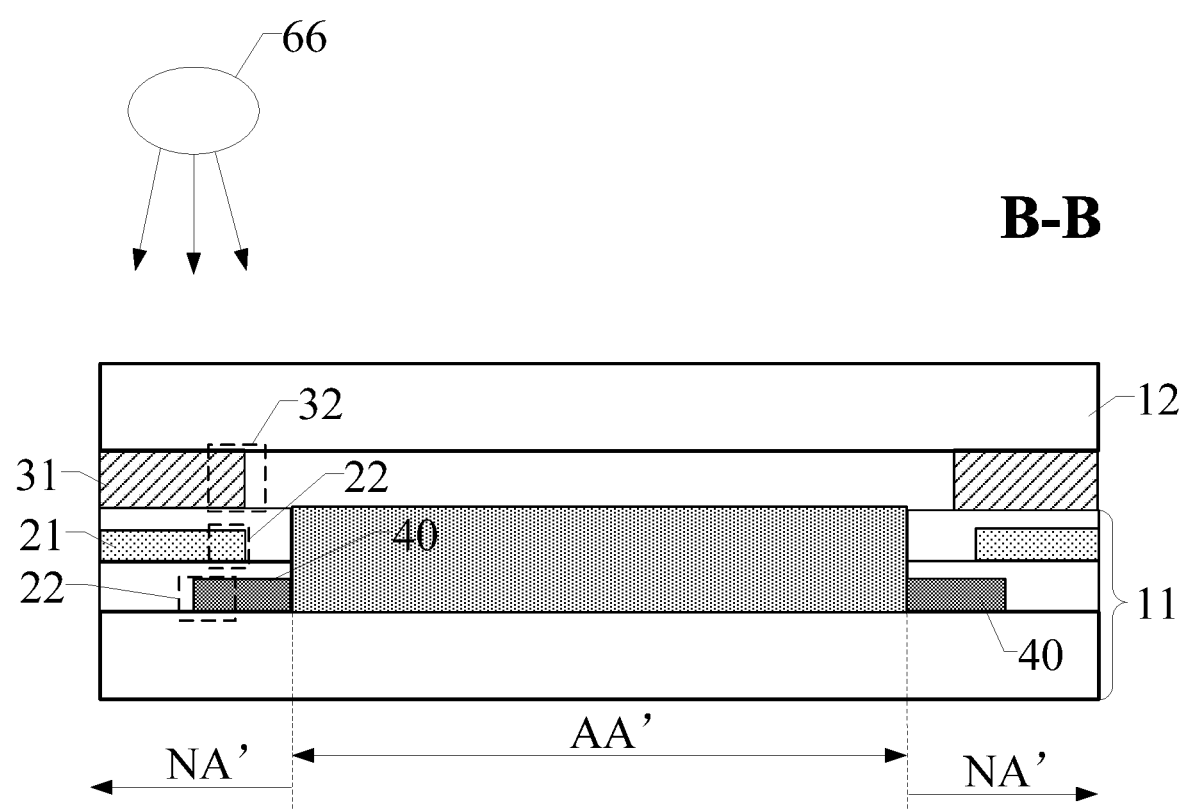
FIG. 11 illustrates another cross-sectional view of a display panel along a BB line in FIG. 2.

FIG. 11 illustrates another cross-sectional view of the display panel 100 along the BB line in FIG. 2. In an optional embodiment of the present disclosure, referring to FIG. 11, when a portion of the second reflective metal parts 22 is electrically connected to the first metal block 40 and the other portion of the second reflective metal parts 22 is electrically connected to the first reflective metal part 21, the first metal block 40 and the first reflective metal part 21 may be disposed in different layers.

For example, FIG. 11 illustrates that, along the direction perpendicular to the light-exiting surface of the display panel, the first metal block 40 may be between the first reflective metal part 21 and the first base substrate 11. In such way, during the laser solidification process, the distance between a portion of the second reflective metal parts 22 and a laser light source 66 may be relatively small, and the distance between the other portion of the second reflective metal parts 22 and the laser light source 66 may be relatively large. For a same unit area, the second reflective metal parts 22 which are relatively close to the laser light source 66 and the second reflective metal parts 22 which are relatively far away from the laser light source 66 may reflect laser energy differently. The different distances may neutralize the energy reflected by two types of the second reflective metal parts 22, such that the regions where the first extension parts 32 are located may obtain a moderate amount of the laser energy, which meets the reliable solidification requirement for the first extension parts 32.

It should be noted that, in some other embodiments of the present application, the first metal block 40 may also be disposed on the side of the first reflective metal part 21 away from the first base substrate 11. For such structure, the principle of reflecting the laser energy by the second reflective metal parts 22 is same as the principle illustrated in FIG. 11, which may not be described in detail herein.

Figure 12:
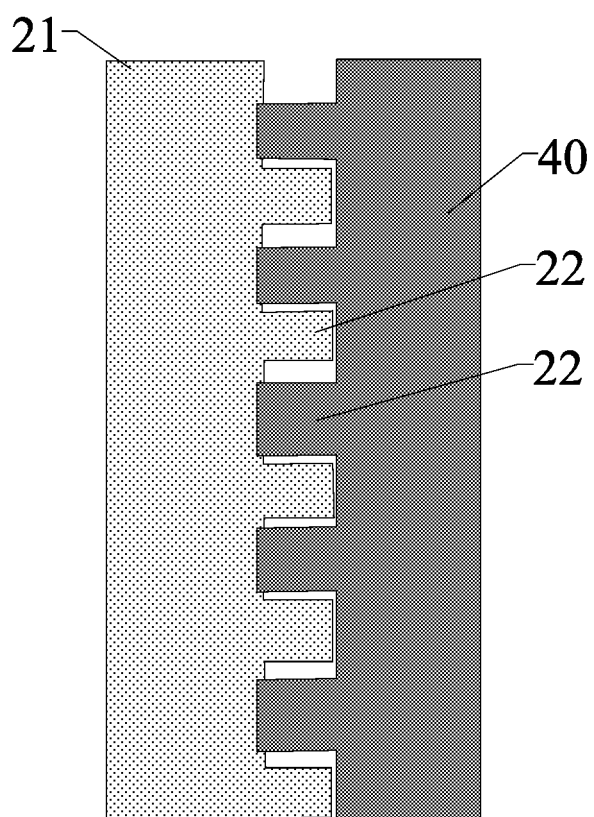
FIG. 12 illustrates a relative position relationship between a first reflective metal part and a first metal block according to various embodiments of the present disclosure.

FIG. 12 illustrates a relative position relationship between the first reflective metal part 21 and the first metal block 40 according to various embodiments of the present disclosure. In an optional embodiment of the present disclosure, referring to FIG. 12, the orthographic projections on the light-exiting surface of at least a portion of the second reflective metal parts 22 electrically connected to the first metal block 40 and the first reflective metal part 21 may partially overlap.

For example, referring to FIG. 2, FIG. 9, and FIG. 12, at least the portion of the second reflective metal parts 22 electrically connected to the first metal block 40 may extend along the direction adjacent to the first reflective metal part 21, and the orthographic projections on the light-exiting surface of at least the portion of the second reflective metal parts 22 and the first reflective metal part 21 may overlap. It is equivalent that the extension degree of the second reflective metal parts 22 from the display region AA to the direction of the first reflective metal part 21 may be increased. Since the first extension part 32 extends along a direction from the first reflective metal part 21 to the display region AA, setting the orthographic projections on the light-exiting surface of the second reflective metal parts 22 and the first reflective metal part 21 to be partially overlapped may be beneficial for increasing the area of the orthographic projections of the second reflective metal parts 22 and the first reflective metal part 21 on the light-exiting surface. In such way, more laser energy reflected by the second reflective metal parts 22 may act on the region where the first extension part 32 is located, which is beneficial for providing more solidification energy to the region where the first extensions part 32 is located. Therefore, it is more beneficial for improving the solidification effect of the region where the first extensions part 32 is located and for reducing the solidification difference between the region where the first extension part 32 is located and the region where the main body part 31 is located, thereby improving the sealing performance and drop-proof performance of the product.

Figure 13:
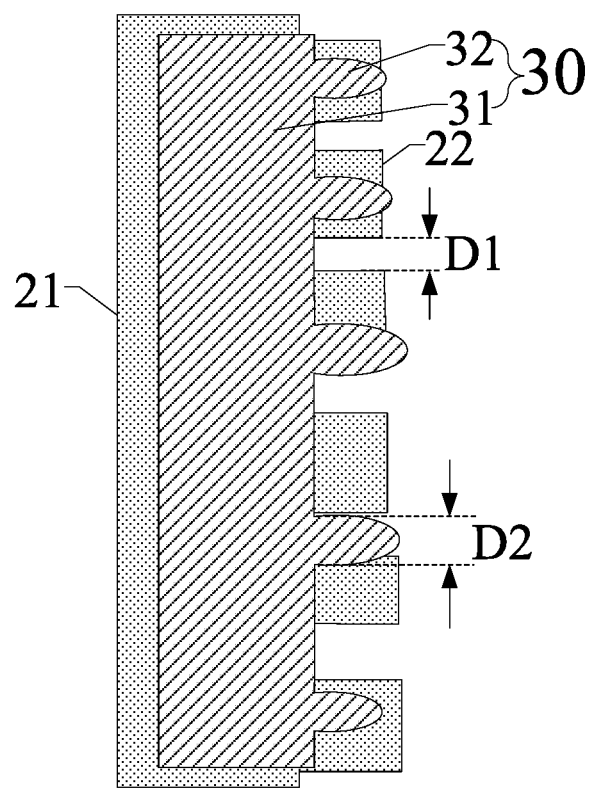
FIG. 13 illustrates another local enlarged schematic of a region Q in FIG. 2.

FIG. 13 illustrates another local enlarged schematic of the region Q in FIG. 2. In an optional embodiment of the present disclosure, referring to FIG. 2 and FIG. 13, along the first direction (e.g., the extension direction of the main body part 31 in the sealing adhesive 30), a first spacing is between any two adjacent second reflective metal parts 22; the minimum width of any first spacing is D1, and the maximum width of the first extension part 32 is D2, where D1<D2.

It should be noted that, in the present disclosure, any two adjacent second reflective metal parts 22 along the first direction may refer to the second reflective metal parts 22 which have adjacent orthographic projections on the first base substrate 11 along the first direction. In one embodiment, the minimum width D1 of the first spacing between any two adjacent second reflective metal parts 22 may be set to be less than the maximum width D2 of the first extension part 32, which is beneficial for ensuring that the orthographic projection of any first extension part 32 on the light-exiting surface overlaps the orthographic projection of at least one second reflective metal part 22 on the light-exiting surface. In such way, during the laser solidification process, any first extension part 32 may receive the laser energy reflected by the corresponding second reflective metal part 22, which may not only reliably solidify the region where the first extension part 32 is located, but also facilitate the improvement of the solidification uniformity of different regions where the first extension parts 32 are located. Therefore, it is more beneficial for improving the overall solidification uniformity of the region where the main body part 31 is located and the region where the first extension part 32 is located of the sealing adhesive 30 and improving the sealing effect and the drop-proof performance of the product.

Figure 14:
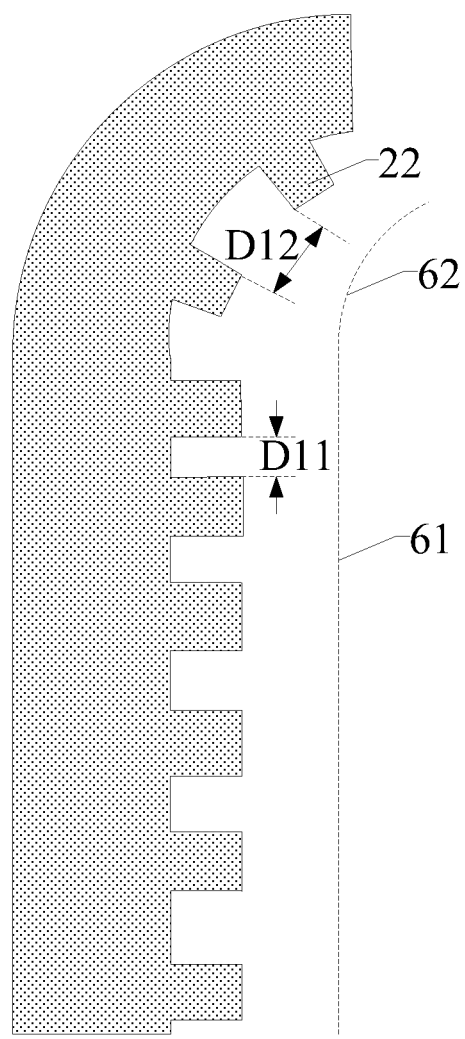
FIG. 14 illustrates a relative position relationship between a portion of a display region edge and a portion of second reflective metal parts in a display panel according to various embodiments of the present disclosure.

FIG. 14 illustrates a relative position relationship between a portion of the edge of the display region AA and a portion of second reflective metal parts 22 in the display panel 100 according to various embodiments of the present disclosure. In an optional embodiment of the present disclosure, referring to FIG. 14, the edge of the display region AA may include a straight edge 61 and an arced edge 62. At least a portion of the second reflective metal parts may be adjacent to the straight edge 61, and at least a portion of the second reflective metal parts may be adjacent to the arced edge 62. Along the first direction, the widths of all second reflective metal parts 22 may be substantially equal.

In the second reflective metal parts adjacent to the straight edge 61, the minimum width of the first spacing between any two adjacent second reflective metal parts 22 is D11; in the second reflective metal parts adjacent to the arced edge 62, the minimum width of the first spacing between any two adjacent second reflective metal parts 22 is D12, where D11<D12.

The display panel 100 may be an irregular display panel, for example, the display region AA may not only include the straight edge 61, but also include the arced edge 62 connecting to the straight edge 61. During the laser solidification process, laser energy may accumulate at the arced edge 62, such that the laser energy at the arced edge 62 may be greater than the laser energy at the straight edge 61. The second reflective metal parts 22 at the arced edge 62 and at the straight edge 61 may be separately arranged in the present application, that is, the arrangement density of the second reflective metal parts 22 adjacent to the arced edge 62 may be less than the arrangement density of the second reflective metal parts 22 adjacent to the straight edge 61. The widths of all second reflective metal parts 22 may be substantially equal, and D11<D12. That is, the size and shape of each second reflective metal parts 22 may be same, but the distance between two adjacent second reflective metal parts may be different. For example, the distance between two adjacent second reflective metal parts adjacent to the arced edge may be greater than the distance between two adjacent second reflective metal parts adjacent to the straight edge. The above-mentioned design may reduce the laser energy reflected by the second reflective metal parts 22 adjacent to the arced edge 62 to the first extension parts 32 to a certain extent, such that it is beneficial to avoid the over solidification due to excessive laser energy reflected by the second reflective metal parts 22 adjacent to the arced edge 62 to the corresponding first extension parts, which may affect the overall solidification uniformity of the sealing adhesive. Therefore, the arrangement density of the second reflective metal parts 22 adjacent to the arced edge 62 may be reduced in the present disclosure, which is beneficial for improving the solidification uniformity of the region of the first extension parts 32 corresponding to the arced edge 62 and the region of the first extension parts 32 corresponding to the straight edge 61, thereby improving the sealing effect and the drop-proof performance of the product.

In another optional embodiment, the spacings between each two adjacent second reflective metal parts may be substantially equal; however, the area of the second reflective metal part disposed at the arced edge may be greater than the area of the second reflective metal part disposed at the straight edge, which ensures that the arrangement density of the second reflective metal parts 22 adjacent to the arced edge 62 is less than the arrangement density of the second reflective metal parts 22 adjacent to the straight edge 61, thereby reducing the laser energy reflected at the arced edge.

Figure 15:
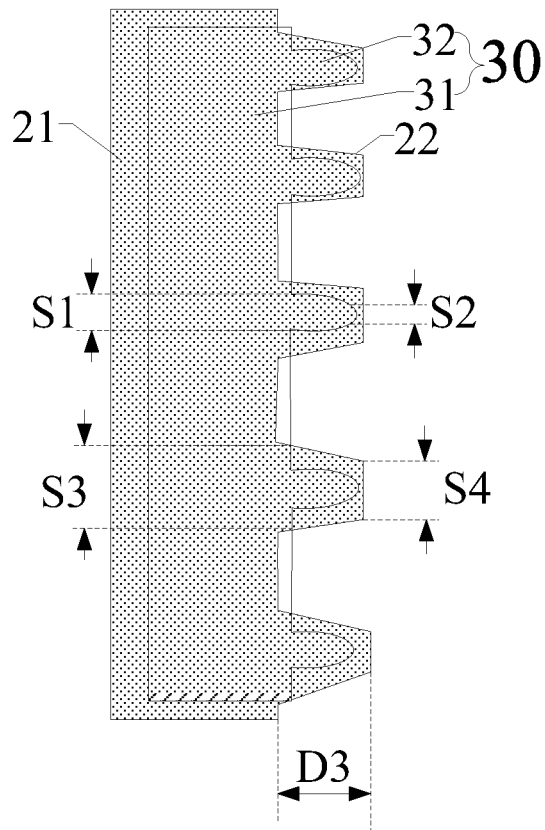
FIG. 15 illustrates another local enlarged schematic of a region Q in FIG. 2.

FIG. 15 illustrates another local enlarged schematic of the region Q in FIG. 2. In an optional embodiment of the present disclosure, referring to FIG. 2 and FIG. 15, in the extension parts 32, the width of the region of the extension part 32, which is adjacent to the main body part 31 along the first direction, is a first width S1, and the width of the region of the extension part 32, which is away from the main body part 31 along the first direction, is a second width S2, where the first width S1 may be greater than the second width S2.

In the second reflective metal parts 22, the width of the region of the second reflective metal part, which is adjacent to the main body part 31 along the first direction, is a third width S3, and the width of the region of the second reflective metal part, which is away from the main body part 31 along the first direction, is a fourth width S4, where the third width S3 may be greater than the fourth width S4.

For example, referring to FIG. 15, the width of the first extension part 32 of the sealing adhesive 30 may decrease along the direction from the main body part 31 to the display region AA. That is, the width of the portion of the first extension part 32 on the side adjacent to the main body part 31 may be greater than the width of the portion of the first extension part 32 on the side away from the main body part 31. In the present disclosure, the shape of the orthographic projection of the second reflective metal part 22 on the light-exiting surface may be set to be similar to the shape of the orthographic projection of the first extension part 32 on the light-exiting surface. That is, the second reflective metal part 22 may also be designed to be a structure having a gradually reduced width along the direction from the main body part 31 to the display region AA, which is compatible with the structure of the first extension part 32. In such way, the laser energy reflected by the second reflective metal part 22 may also show a decreasing trend along the direction from the main body part 31 to the display region AA, such that different regions of the first extension part 32 may receive different laser energy. The region with a relatively large width may receive a relatively large amount of laser energy, and the region with a relatively small width may receive a relatively small amount of laser energy, such that the solidification effect of different regions of each first extension part 32 may be more uniform; meanwhile, it is also beneficial for reducing the solidification difference between the region where the first extension part 32 is located and the region where the main body part 31 is located.

It should be noted that the second reflective metal part in the above-mentioned embodiment may be electrically connected to the first reflective metal part or the first metal block. It should be understood that, in some optional embodiments of the present disclosure, the second reflective metal part may also be disposed separately. The second reflective metal part may be neither electrically connected to the first reflective metal part nor electrically connected to the first metal block, as long as the orthographic projections of the second reflective metal part and the first extension part on the light-exiting surface of the display panel overlap, which may also achieve the solidification effect on the region corresponding to the first extension part, thereby reducing the solidification difference between the first extension part and the main body part. Furthermore, the separately disposed second reflective metal part may be disposed in a same layer as the first reflective metal part or the first metal block, and may also be disposed in a different layer, which may not be limited according to the embodiments of the present disclosure.

Referring to FIG. 2 and FIG. 15, in an optional embodiment of the present disclosure, the length of the second reflective metal part 22 is D3 along the direction from the display region AA to the non-display region NA, where D3≥30 μm.

For example, along the direction from the display region AA to the non-display region NA, the length of the first extension part 32 connected to the main body part 31 in the sealing adhesive 30 may be between 20 μm and 30 μm. In the present disclosure, the length of the second reflective metal part 22 may be set to be greater than or equal to 30 μm, which is beneficial for increasing the overlapped area of the orthographic projections of the second reflective metal part 22 and the first extension part 32 on the light-exiting surface. Therefore, it is beneficial for increasing the laser energy reflected to the first extension part 32 through the second reflective metal part 22 and for improving the sealing solidification effect of the region corresponding to the first extension part 32.

Figure 16:
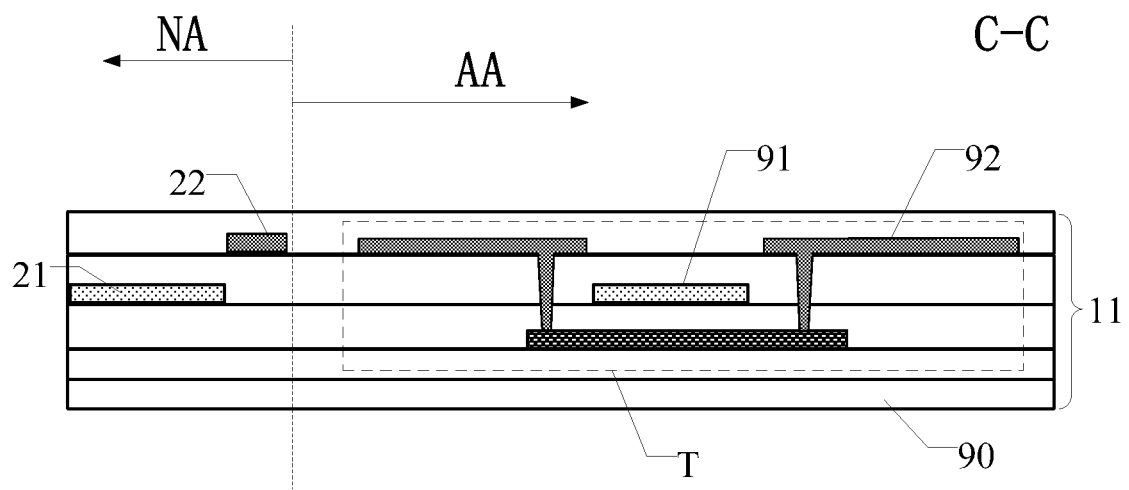
FIG. 16 illustrates another cross-sectional view of a display panel along a CC line in FIG. 2.

FIG. 16 illustrates another cross-sectional view of the display panel 100 along a CC line in FIG. 2. In an optional embodiment of the present disclosure, referring to FIG. 16, the first base substrate 11 may include a first substrate 90 and a first metal layer 91 and at least one second metal layer 92 over the first substrate 90. Along the direction perpendicular to the first substrate 91, the first metal layer 91 and the second metal layer 92 may be on the side of the first base substrate 11 facing toward the second base substrate 12, and the first metal layer 91 may be between the first base substrate 11 and the second metal layer 92.

The first reflective metal part 21 may be at the first metal layer 91 or the second metal layer 92; and the second reflective metal part 22 may be at the first metal layer 91 and/or the second metal layer 92.

For example, FIG. 16 illustrates the cross-sectional view of a portion of the non-display region NA and a portion of the display region AA in the display panel 100. The plurality of thin-film transistors T may be disposed in the display region AA, where the film layer of the gate electrode of the thin-film transistor T may be the first metal layer 91, and the film layer of the source/drain electrode of the thin-film transistor T may be the second metal layer 92. The first reflective metal part 21 at the first metal layer 91 and the second reflective metal part 22 at the second metal layer 92 may be illustrated in one embodiment. In such way, when the first reflective metal part 21 and the second reflective metal part 22 are introduced in the display panel 100, there is no need to introduce a new film layer structure for the first reflective metal part 21 and the second reflective metal part 22, and the first metal layer 91 and the second metal layer 92 existing in the display panel 100 may be multiplexed. The formation of the first reflective metal part 21 may be completed with the formation of the first metal layer 91 simultaneously; and the formation of the second reflective metal part 22 may be completed with the formation of the second metal layer 92 simultaneously. Therefore, it is not only beneficial for simplifying the film layer structure of the display panel 100 when introducing the first reflective metal part 21 and the second reflective metal part 22, and also beneficial for the formation process when introducing the first reflective metal part 21 and the second reflective metal part 22, thereby improving the production efficiency of the display panel 100.

It should be noted that FIG. 16 may no illustrate all film layer structures included in the first base substrate. Optionally, the first base substrate may further include film layers such as a light-exiting layer, an encapsulation layer, and the like, which may not be limited according to the embodiments of the present disclosure.

Figure 17:
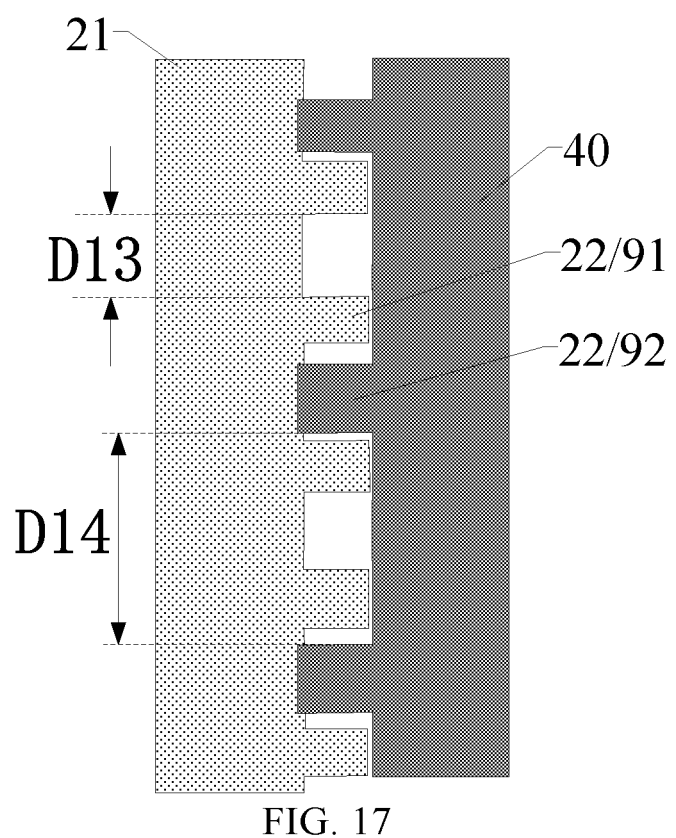
FIG. 17 illustrates another relative position relationship between a first reflective metal part and a first metal block according to various embodiments of the present disclosure.

FIG. 17 illustrates another relative position relationship between the first reflective metal part 21 and the first metal block 40 according to various embodiments of the present disclosure. In an optional embodiment of the present disclosure, referring to FIGS. 16-17, at least a portion of the second reflective metal parts 22 may be located at the first metal layer 91; at least a portion of the second reflective metal parts 22 may be located at the second metal layer 92; and the widths of all second reflective metal parts 22 may be same along the first direction.

In the second reflective metal parts 22 at the first metal layer 91, the minimum width of the first spacing between any two adjacent second reflective metal parts 22 is D13; and in the second reflective metal parts 22 at the second metal layer 92, the minimum width of the first spacing between any two adjacent second reflective metal parts 22 is D14, where D13<D14.

For example, since the distance between the first metal layer 91 and the laser light source is greater than the distance between the second metal layer 92 and the laser light source in the laser solidification process, the laser energy which can be reflected by the second reflective metal part 22 located at the first metal layer 91 may be less than the laser energy which can be reflected by the second reflective metal part 22 located at the second metal layer 92 for a same unit area. In order to make the laser energy reflected by the second reflective metal parts 22 at the first metal layer 91 and the second metal layer 92 more uniform, the arrangement density of the second reflective metal parts 22 located at the first metal layer 91 may be set to be greater than the arrangement density of the second reflective metal parts 22 located at the second metal layer 92 in the present disclosure. That is, when the widths of all second reflective metal parts 22 along the first direction are substantially equal, D13 is set to be less than D14, which may be beneficial for increasing the laser energy which can be reflected by the second reflective metal parts 22 located at the first metal layer 91, thereby reducing the difference between the laser energy which can be reflected by the second reflective metal parts 22 located at the second metal layer 92 and the laser energy which can be reflected by the second reflective metal parts 22 located at the first metal layer 91. Therefore, it is beneficial for improving the uniformity of the laser energy which can be reflected by all second reflective metal parts 22, and further beneficial for improving the solidification uniformity of the sealing adhesive 30 in the region where the first extension parts 32 are located.

Figure 18:
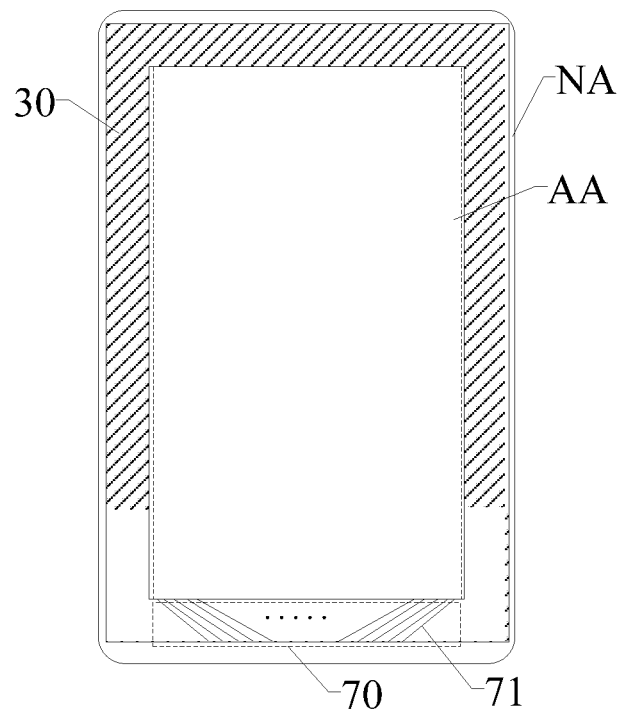
FIG. 18 illustrates another top view of a display panel according to various embodiments of the present disclosure.

FIG. 18 illustrates another top view of the display panel 100 according to various embodiments of the present disclosure. In an optional embodiment of the present disclosure, referring to FIG. 18, the non-display region NA of the display panel 100 may include a fan-out wiring region 70 including a plurality of fan-out wires 71. In the fan-out wiring region 70, the orthographic projections of the fan-out wires 71 and the sealing adhesive 30 on the light-exiting surface may at least partially overlap.

For example, in one embodiment show in FIG. 18, the first reflective metal part may half-enclose the display region (not shown). The first reflective metal part may be distributed at the left, right and upper border regions of the display panel, and may not be disposed at the lower border region. Since the orthographic projections of the fan-out wires 71 and the sealing adhesive 30 at least partially overlap at the lower border region of the display panel, the fan-out wires 71 in the fan-out wiring region 70 may be multiplexed as the reflective metal layer. In the laser solidification process, the fan-out wires 71 and the first reflective metal part in other non-display region NA may jointly reflect the laser energy for the main body part 31 of the sealing adhesive 30. Therefore, there is no need to additionally form the first reflective metal part in the fan-out wiring region 70, which is beneficial for simplifying the film layer structure of the display panel 100 and reducing the fabrication cost of the display panel 100.

Figure 19:
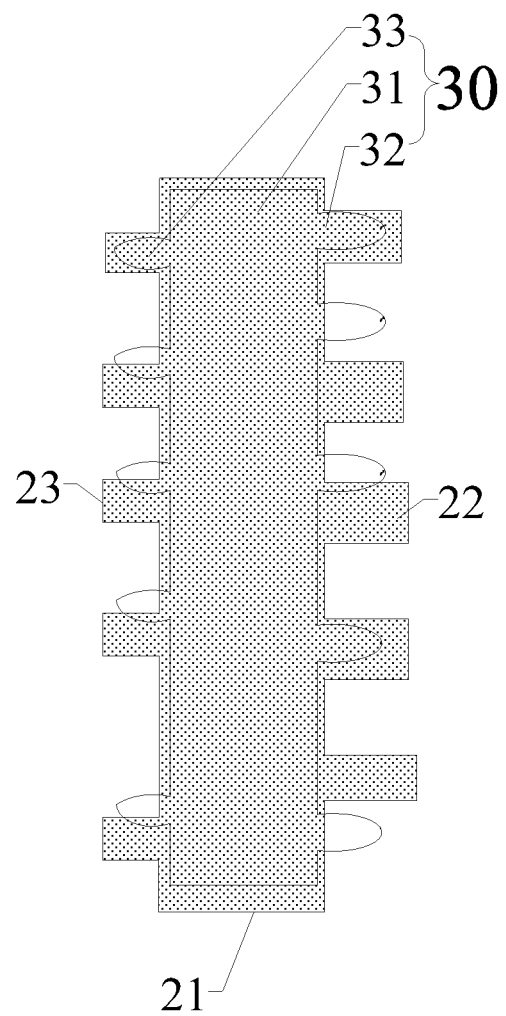
FIG. 19 illustrates another local enlarged schematic of a region Q in FIG. 2.

FIG. 19 illustrates another local enlarged schematic of the region Q in FIG. 2. In an optional embodiment of the present disclosure, referring to FIG. 19, the sealing adhesive 30 may further include a plurality of second extension parts 33 connected to the main body part 31. The second extension part 33 may be located on the side of the main body part 31 away from the display region AA. The plurality of second extension parts 33 may be arranged along the first direction.

The display panel 100 may further include third reflective metal parts 23. The orthographic projection of the third reflective metal part 23 on the light-exiting surface may be on the side of the main body part 31 away from the display region AA. The orthographic projections of at least one third reflective metal part 23 and the second extension parts 33 on the light-exiting surface may overlap.

For example, FIG. 19 illustrates that the sealing adhesive 30 in the non-display region NA may further include the plurality of second extension parts 33. Referring to FIG. 2 and FIG. 19, the sealing adhesive 30 in one embodiment may not only include the first extension parts 32 between the main body part 31 and the display region AA, but also include the second extension part 33 on the side of the main body part 31 away from the display region AA. That is, the first extension parts 32 and the second extension parts 33 may be respectively distributed on two sides of the main body part 31. In order to ensure that the regions corresponding to the second extension parts 33 can be reliably solidified, the third reflective metal parts 23 may be introduced in the display panel 100 of the present disclosure, and the orthographic projections of the third reflective metal parts 23 and the second extension parts 33 on the light-exiting surface may overlap. In such way, the third reflective parts 23 may reflect the laser required for solidification to the regions where the second extension parts are located, such that the regions corresponding to the second extension parts 33 may be solidified, thereby facilitating the reduction of the solidification difference between the second extension parts 33 and the main body part and improving the solidification uniformity of the entire sealing adhesive 30.

In an optional embodiment of the present disclosure, the third reflective metal parts 23 may be electrically connected to the first reflective metal part 21, together formed into one single piece. In such way, the formation of the third reflective metal parts 23 may be completed with the formation of the first reflective metal part 21 simultaneously. There is no need to separately introduce the film layer structure and the formation process for the third reflective metal parts 23. Therefore, it is beneficial for improving the production efficiency of the display panel 100 after introducing the third reflective metal parts 23.

In an optional embodiment of the present disclosure, referring to FIG. 3 and FIG. 19, the orthographic projection of the main body part 31 on the light-exiting surface may be within the orthographic projection of the first reflective metal part 21 on the light-exiting surface. In such way, most of the laser energy reflected by the first reflective metal part 21 may be reflected to the corresponding main body part 31 during the laser solidification process, thereby facilitating the improvement of the solidification effect of the main body part 31.

Figure 20:
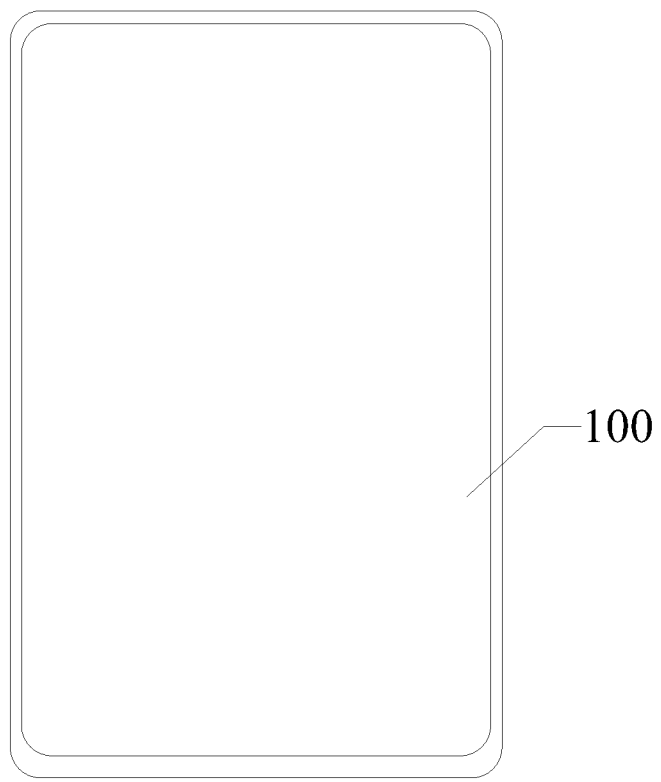
FIG. 20 illustrates a structural schematic of a display device according to various embodiments of the present disclosure.

Based on the same inventive concept, the present disclosure also provides a display device 200. FIG. 20 illustrates a structural schematic of the display device 200 according to various embodiments of the present disclosure. The display device may include the display panel 100 which is the display panel provided in the above-mentioned embodiments of the present application. It should be noted that the embodiments of the display device 200 provided in the embodiments of the present application may refer to the embodiments of the above-mentioned display panel, which may not be described in detail herein. The display device 200 provided in present application may be any product or component with display function, such as a mobile phone, a tablet computer, a television, a monitor, a notebook computer, a digital photo border, a navigator, and the like.

From the above-mentioned embodiments, it can be seen that the display panel and the display device provided by the present disclosure may achieve at least the following beneficial effects.

The display panel and the display device provided by the present disclosure may include the first base substrate and the second base substrate, which are oppositely configured, and the sealing adhesive between the first base substrate and the second base substrate. The sealing adhesive may be in the non-display region NA and surround the display region. The composition of the sealing adhesive may include frit. During the sealing process, the frit may be melted by laser heating and then the melted frit may be solidified to bond and fix the first base substrate with the second base substrate. The sealing adhesive may include the main body part and the plurality of first extension parts connected to the main body part; and the first extension parts may be between the main body part and the display region. The display panel of the present disclosure may further include the first reflective metal part corresponding to the main body part of the sealing adhesive and the second reflective metal parts corresponding to the first extension parts of the sealing adhesive. The first reflective metal part may be used to reflect the laser energy to the main body part, thereby providing solidification energy for the region corresponding to the main body part. The second reflective metal parts may be used to reflect the laser energy to the first extension parts, thereby providing solidification energy for the regions corresponding to the first extension parts. Therefore, during the laser solidification process in the existing technology, not complete solidification of the sealing adhesive because of no metal at the region corresponding to the burrs to reflect heat energy may be improved, thereby facilitating the improvement of the sealing performance and drop-proof performance of the product.

Although certain embodiments of the present disclosure have been described in detail through examples, those skilled in the art should understand that the above-mentioned examples are merely for illustration and not for limiting the scope of the present disclosure. Those skilled in the art should understand that the above-mentioned embodiments may be modified without departing from the scope and spirit of the present disclosure, and the scope of the present disclosure is defined by the appended claims.

What is claimed is:

1. A display panel, including a display region and a non-display region surrounding the display region, the display panel comprising:
a first base substrate and a second base substrate that are oppositely configured;
a sealing adhesive between the first base substrate and the second base substrate, wherein:
the sealing adhesive is in the non-display region and surrounds the display region;
the sealing adhesive includes a main body part and a plurality of first extension parts connected to the main body part; and
the plurality of the first extension parts is between the main body part and the display region and arranged along a first direction, the first direction being an extending direction of the main body part;
a first reflective metal part in the non-display region, wherein at least a portion of the first reflective metal part surrounds the display region, and orthographic projections of the first reflective metal part and the main body part on a light-exiting surface of the display panel at least partially overlap; and
a plurality of second reflective metal parts in the non-display region, wherein the plurality of second reflective metal parts is arranged along the first direction and disposed on a side of the first reflective metal part adjacent to the display region, and orthographic projections of at least one second reflective metal part of the plurality of second reflective metal parts and the plurality of first extension parts on the light-exiting surface overlap.

2. The display panel according to claim 1, wherein:
the plurality of second reflective metal parts and the first reflective metal part are electrically connected with each other and formed into one single piece.

3. The display panel according to claim 2, wherein:
the first reflective metal part is connected to a fixed level signal.

4. The display panel according to claim 1, further including:
a first metal block extending along the first direction, wherein:
the first metal block is disposed on a side of the plurality of second reflective metal parts adjacent to the display region; and
the plurality of second reflective metal parts and the first metal block are electrically connected with each other and formed into one single piece.

5. The display panel according to claim 1, further including:
a first metal block extending along the first direction, wherein:
the first metal block is disposed on a side of the plurality of second reflective metal parts adjacent to the display region;
at least one portion of the plurality of second reflective metal parts is electrically connected with the first reflective metal part, together formed into one single piece; and
at least one portion of the plurality of second reflective metal parts is electrically connected with the first metal block, together formed into one single piece.

6. The display panel according to claim 5, wherein:
the at least one portion of the plurality of second reflective metal parts that is electrically connected to the first metal block and the at least one portion of the plurality of second reflective metal parts that is electrically connected to the first reflective metal part are alternately arranged along the first direction.

7. The display panel according to claim 5, wherein:
the first metal block and the first reflective metal part are disposed at different layers.

8. The display panel according to claim 7, wherein:
orthographic projections on the light-exiting surface of the at least one portion of the plurality of second reflective metal parts, which is electrically connected to the first metal block, and the first reflective metal part partially overlap.

9. The display panel according to claim 5, wherein:
the first metal block is connected to a fixed level signal.

10. The display panel according to claim 1, wherein:
along the first direction, a first spacing is between any two adjacent second reflective metal parts of the plurality of second reflective metal parts; a minimum width of any first spacing is D1; and a maximum width of a first extension part of the plurality of first extension parts is D2, wherein D1<D2.

11. The display panel according to claim 1, wherein:
an edge of the display region includes a straight edge and an arced edge; at least one portion of the plurality of second reflective metal parts is adjacent to the straight edge; at least one portion of the plurality of second reflective metal parts is adjacent to the arced edge; and along the first direction, widths of all second reflective metal parts are substantially equal; and
in the at least one portion of the plurality of second reflective metal parts adjacent to the straight edge, a minimum width of a first spacing between any two adjacent second reflective metal parts of the plurality of second reflective metal parts is D11; in the at least one portion of the plurality of second reflective metal parts adjacent to the arced edge, a minimum width of a first spacing between any two adjacent second reflective metal parts of the plurality of second reflective metal parts is D12, wherein D11<D12.

12. The display panel according to claim 1, wherein:
in a first extension part of the plurality of first extension parts, the first extension part has a first width in a region adjacent to the main body part along the first direction and a second width in a region away from the main body part along the first direction, wherein the first width is greater than the second width; and
in a second reflective metal part of the plurality of second reflective metal parts, the second reflective metal part has a third width in a region adjacent to the main body part along the first direction and a fourth width in a region away from the main body part along the first direction, wherein the third width is greater than the fourth width.

13. The display panel according to claim 1, wherein:
along a direction from the display region to the non-display region, a length of a second reflective metal part of the plurality of second reflective metal parts is D3, wherein D3≥30 μm.

14. The display panel according to claim 1, wherein:
the first base substrate includes a first substrate, and a first metal layer and at least one second metal layer over the first substrate; and along a direction perpendicular to the first substrate, the first metal layer and the second metal layer are on a side of the first base substrate facing toward the second base substrate, and the first metal layer is between the first substrate and the second metal layer; and the first reflective metal part is at the first metal layer or the second metal layer, and the plurality of second reflective metal parts is at the first metal layer and/or the second metal layer.

15. The display panel according to claim 14, wherein:

at least one portion of the plurality of second reflective metal parts is at the first metal layer; at least one portion of the plurality of second reflective metal parts is at the second metal layer; and along the first direction, widths of all second reflective metal parts are substantially equal; and in the at least one portion of the plurality of second reflective metal parts at the first metal layer, a minimum width of a first spacing between any two adjacent second reflective metal parts of the plurality of second reflective metal parts is D13; and in the at least one portion of the plurality of second reflective metal parts at the second metal layer, a minimum width of a first spacing between any two adjacent second reflective metal parts of the plurality of second reflective metal parts is D14, wherein D13<D14.

16. The display panel according to claim 1, wherein:

the non-display region includes a fan-out wiring region including a plurality of fan-out wires; and in the fan-out wiring region, orthographic projections of the fan-out wires and the sealing adhesive on the light-exiting surface at least partially overlap.

17. The display panel according to claim 1, wherein:

the sealing adhesive further includes a plurality of second extension parts connected to the main body part; and the plurality of second extension parts is on a side of the main body part away from the display region and is arranged along the first direction; and the display panel further includes third reflective metal parts; an orthographic projection of the third reflective metal parts on the light-exiting surface is on the side of the main body part away from the display region; and orthographic projections of at least one third reflective metal part and the plurality of second extension parts on the light-exiting surface overlap.

18. The display panel according to claim 17, wherein:

the third reflective metal parts and the first reflective metal part are electrically connected with each other and formed into one single piece.

19. The display panel according to claim 1, wherein:

the orthographic projection of the main body part on the light-exiting surface is within the orthographic projection of the first reflective metal part on the light-exiting surface.

20. A display device, comprising:

a display panel, including a display region and a non-display region surrounding the display region, the display panel comprising:
    a first base substrate and a second base substrate that are oppositely configured;
    a sealing adhesive between the first base substrate and the second base substrate, wherein:
        the sealing adhesive is in the non-display region and surrounds the display region;
        the sealing adhesive includes a main body part and a plurality of first extension parts connected to the main body part; and
        the plurality of the first extension parts is between the main body part and the display region and arranged along a first direction, the first direction being an extending direction of the main body part;
    a first reflective metal part in the non-display region, wherein at least a portion of the first reflective metal part surrounds the display region, and orthographic projections of the first reflective metal part and the main body part on a light-exiting surface of the display panel at least partially overlap; and
    a plurality of second reflective metal parts in the non-display region, wherein the plurality of second reflective metal parts is arranged along the first direction and disposed on a side of the first reflective metal part adjacent to the display region, and orthographic projections of at least one second reflective metal part of the plurality of second reflective metal parts and the plurality of first extension parts on the light-exiting surface overlap.

* * * * *